United States Patent [19]
Kiteley

[11] Patent Number: 4,510,400
[45] Date of Patent: Apr. 9, 1985

[54] SWITCHING REGULATOR POWER SUPPLY

[75] Inventor: Kenneth J. Kiteley, Schaumburg, Ill.

[73] Assignee: Zenith Electronics Corporation, Glenview, Ill.

[21] Appl. No.: 407,417

[22] Filed: Aug. 12, 1982

[51] Int. Cl.³ .............................................. H02J 9/06
[52] U.S. Cl. ..................................... 307/66; 323/222
[58] Field of Search ...................... 307/64, 66, 44, 46, 307/48; 365/229; 371/66; 363/142, 18, 19, 22, 23; 323/222, 906

[56] References Cited
U.S. PATENT DOCUMENTS

| | | | |
|---|---|---|---|
| 3,696,286 | 10/1972 | Ule | 323/906 |
| 3,757,131 | 9/1973 | Krutz et al. | 307/66 X |
| 3,769,571 | 10/1973 | Wilkinson | 363/142 X |
| 3,873,846 | 3/1975 | Morio et al. | 307/66 X |
| 4,209,710 | 6/1980 | Quarton | 307/66 X |
| 4,225,792 | 9/1980 | Fahey | 307/66 |
| 4,227,257 | 10/1980 | Sato | 455/343 |
| 4,249,089 | 2/1981 | Wolford et al. | 307/140 |
| 4,322,787 | 3/1982 | Kraus | 323/222 X |

OTHER PUBLICATIONS

Hopper, High Efficiency Boost Regulator Design for Planetary Spacecraft, Sep. 1969.

Primary Examiner—A. D. Pellinen
Assistant Examiner—Todd E. DeBoer

[57] ABSTRACT

The power supply of the present invention regulates the output of a DC voltage source, such as a storage battery, and is adapted to operate in combination with a rectified AC voltage to continue to provide a level DC output voltage in the event AC line power is lost. The switching regulator power supply automatically turns on in response to an AC line outage and provides a DC output voltage regulated by a feedback control arrangement which precisely controls the DC output voltage level. When the rectified AC line voltage is restored, the switching regulator power supply automatically turns off thus reducing DC voltage source usage and prolonging storage battery operating lifetime. The switching regulator power supply of the present invention is particularly adapted for low current applications including providing a well-regulated DC voltage to a volatile memory device of the general complementary-metal-oxide semiconductor type (CMOS) on a standby basis in the event the primary DC source is lost.

9 Claims, 1 Drawing Figure

U.S. Patent    Apr. 9, 1985    4,510,400
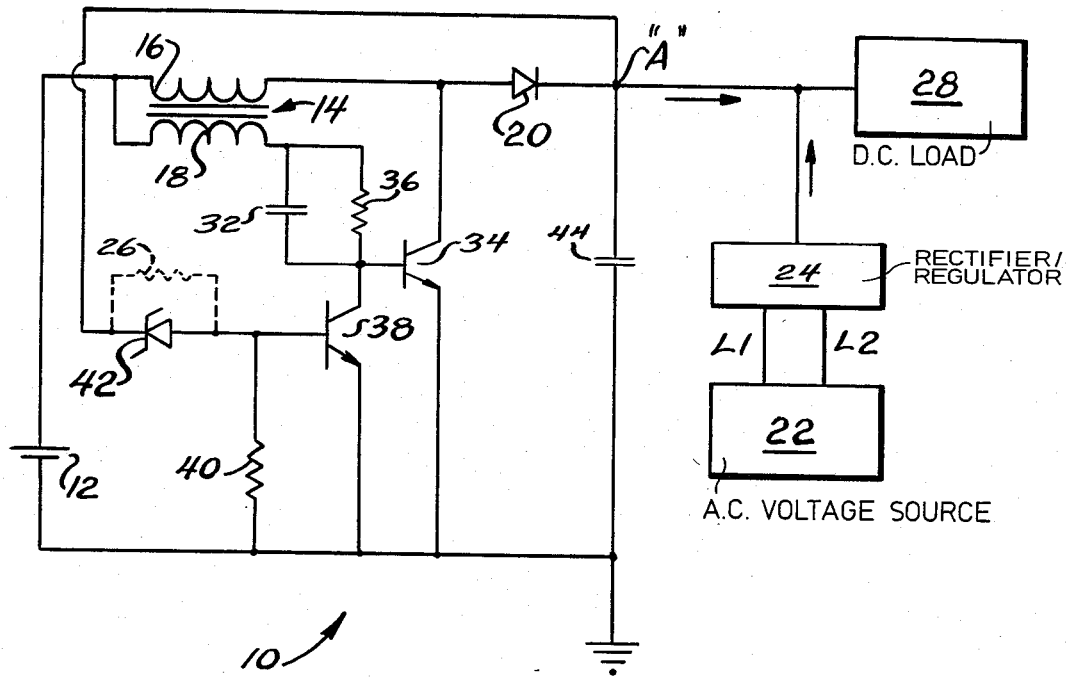

SWITCHING REGULATOR POWER SUPPLY

BACKGROUND OF THE INVENTION

This invention generally relates to DC voltage power supplies and more specifically is directed to a power supply for providing a well-regulated DC voltage output on a standby basis when a primary DC voltage source is removed or no longer available to drive a load.

DC power supplies capable of providing a well-regulated output voltage have widespread application, particularly in driving a wide variety of electronic devices. These DC power supplies typically include a conventional switching voltage regulator comprising an electronic switch such as a transistor and a comparator for comparing the output voltage of the regulator with a reference voltage and for turning off the switch when the output voltage exceeds a predetermined value. The output voltage is generally developed across a filter capacitor for providing a more constant, or level, DC output voltage. This type of switched-mode power supply is somewhat inefficient in that it typically utilizes a pulse width modulator which requires a large current for controlling the operation of the electronic switch.

One area in which low voltage DC power supplies are finding increasing utilization is in energizing microcomputer systems. These systems typically include a volatile memory and sometimes a nonvolatile memory of the complementary-metal-oxide semiconductor (CMOS) type which have extremely low standby power dissipation while requiring a high level of voltage regulation of the DC inputs provided thereto. Variation in the DC inputs provided to the microcomputer can readily affect the sequence of logic operations in the microcomputer so as to render the results thereof useless. In addition, in the case of a volatile memory, the contents thereof may be lost and thus unavailable for subsequent use if the DC input power drops below a predetermined voltage level. This type of power outage may be due to any one of a large variety of causes, perhaps the most common being due to short-term power line dropouts which occur, for example, when lightning strikes near a power line.

One approach to providing standby power in the event of a power loss involves the use of a power storage element such as a capacitor or a battery. While relatively small value capacitors may be used as power storage elements where the load device requires relatively small amounts of operating power, large value capacitors are needed in systems having digital signal processing devices which require relatively large amounts of operating power. As system power requirements increase, so do the size of the capacitors needed to provide the increased energizing voltages. The battery backup power supply system of the prior art has been undesirable as the batteries require frequent replacement or recharging circuitry which increases the complexity of the system. Moreover, batteries and relatively large value capacitors tend to be expensive.

A system for providing backup power for a memory element is disclosed in U.S. Pat. No. 4,227,257 to Sato wherein a second output terminal connected directly to the main power supply for powering the memory element is provided. Also provided are a capacitor for providing power to the second output terminal during interruptions of the main power source, a Zener diode for regulating the voltage of the second output when a power switch is turned off and a pair of diodes for allowing the second terminal to be driven by a voltage regulator output during normal operation and for preventing the second output terminal from driving the remaining circuitry when the power switch is turned off.

U.S. Pat. No. 4,249,089 to Wolford discloses a system wherein memory means are provided for storing a binary signal having first and second levels corresponding respectively to the "on" and "off" operating conditions of the system during the presence of operating power. Storage means are coupled to the memory means for selectively developing an enabling signal in response to the first level and restoring the enabling signal for a predetermined time period after the start of power dropouts. Switching means coupled to the memory means is rendered operative at the end of power dropouts to set the binary signal to its first level if the enabling signal output of the storage means is still present and to otherwise set the binary signal to its second level for rendering the system in an "off" operating condition. This system utilizes complicated control circuitry for detecting primary power source outage and switching to the backup supply.

U.S. Pat. No. 4,225,792 to Fahey discloses a detector circuit for detecting the loss or reduction of DC power to a DC load and for detecting a low battery voltage condition of a standby battery employd to power the load upon loss or reduction of DC power supplied to the DC load. The DC voltages utilized for energizing the DC load and charging the battery are derived from a DC power supply circuit with which the detector circuit of this invention is used. The detector circuit includes a transfer circuit responsive to the DC voltage provided to a load for selectively coupling either a primary DC power supply or a standby DC power supply to the load in response to the output voltage of the primary DC power supply. This circuit represents a complicated approach to providing backup DC power in the event of primary power source outage.

The present invention is intended to overcome the aforementioned limitations of the prior art by providing a switching regulator power supply which automatically switches to a backup state when primary DC power is lost and automatically turns off when primary DC power is reinstated. Thus, the present invention utilizes less power, eliminates RFI during periods of primary DC power supply operation, is particularly adapted for low current applications, and reduces the voltage requirements and prolongs the useful lifetime of a storage battery used as the backup DC power supply.

OBJECTS OF THE INVENTION

Accordingly, it is an object of the present invention to provide an improved DC power supply having a well-regulated output voltage.

It is another object of the present invention to provide a standby DC voltage power supply which is actuated in response to the removal of a primary DC voltage source and which automatically turns OFF when said primary DC voltage source is restored.

A further object of the present invention is to provide a DC power supply having improved output voltage regulation by means of a feedback control arrangement wherein DC voltage level is precisely and automatically controlled.

A further object of the present invention is to provide an improved system for energizing a volatile memory cell in the event its primary DC source is removed.

A still further object of the present invention is to provide an improved switched-mode DC power supply particularly adapted for low current applications.

BRIEF DESCRIPTION OF THE DRAWINGS

The appended claims set forth those novel features believed charcteristic of the invention. However, the invention itself as well further objects and advantages thereof will best be understood by reference to the following detailed description of a preferred embodiment taken in conjunction with the accompanying drawing wherein a switching regulator power supply in accordance with a preferred embodiment of the present invention is shown in schematic and simplified block diagram form.

DESCRIPTION OF THE PREFERRED EMBODIMENTS

Referring to the FIGURE, there is shown in schematic and block diagram form a switching regulator power supply 10 in accordance with the present invention.

A DC voltage source 12, such as a storage battery, is coupled to a first winding 16 of a coil 14. The coil 14 includes a second winding 18 inductively coupled to the first winding 16. While a level DC input is provided to the first and second windings 16, 18 by the DC voltage source 12, the outputs of these windings are a series of pulses due to the flyback, or energy storage-release characteristics of the coil 14. The periodic charging and discharging of the coil 14 results in an amplified voltage output therefrom. For example, in a preferred embodiment of the present invention, DC voltage source 12 is a Ni-Cd storage battery having a 1.25 VDC output, with the coil 14 having a 5 VDC output.

The output voltage from the first winding 16 of coil 14 is provided via diode 20 to a DC load 28. Similarly, a primary DC source comprised of the combination of an AC voltage source 22 coupled via lines L1, L2 to a rectifier/regulator circuit 24 provides a primary DC voltage to the load 28. The AC voltage source 22 may be a conventional AC line source and rectifier/regulator circuit 24 may be conventional in design. In a preferred embodiment of the present invention, the load 28 is a volatile CMOS memory cell typically utilized in a microprocessor or microcomputer. The AC voltage source 22 acts as a primary power supply for the load device 28, while the switching regulator power supply 10 of the present invention performs the function of a backup supply for energizing the load in the event the primary power supply is removed. The pulsed output from the first winding 16 of coil 14 is filtered by means of grounded capacitor 44 so as to provide a level DC voltage to the load device 28 when the AC voltage source 22 is removed. With the primary DC source comprised of AC voltage source 22 and rectifier/regulator circuit 24 providing a DC input to the load device 28, the voltage at point "A" in the FIGURE is sufficient to maintain capacitor 44 in a fully charged state and the discharge of the DC voltage source 12 is thus avoided. In this manner, storage battery operating lifetime is increased.

The output of the second winding 18 of coil 14 is provided via the parallel arrangement of capacitor 32 and resistor 36 to the base of a switching transistor 34 and the collector of a regulating transistor 38. Capacitor 32 provides for AC coupling between the second winding 18 and the respective terminals of switching and regulating transistors 34, 38. Resistor 36 provides for the proper turn-on biasing of switching transistor 34. An output provided from the second winding 18 via capacitor 32 and resistor 36 renders switching transistor 34 conductive. With switching transistor 34 conducting, its collector goes to zero volts resulting in the back-biasing of diode 20 which is thereby rendered nonconductive. This insures that the discharge of filter capacitor 44 is provided only to the DC load device 28. Thus, a continuous, level DC voltage is provided by the sequential discharge of coil 14 and capacitor 44 to DC load device 28. In addition, with switching transistor 34 conductive, coil 14 becomes charged by DC source 12.

When the pulsed output from the second winding 18 is removed from the base of switching transistor 34, the switching transistor 34 is rendered nonconductive, resulting in the discharge of coil 14 via diode 20 to filter capacitor 44 resulting in the charging thereof. Thus, the continuous storing and release of energy by the coil 14 is processed by diode 20 and filter capacitor 44 so as to provide a level, continuous DC output voltage to the load device 28.

The cathode of a Zener diode 42 is connected to point A, to which the output of the switching regulator power supply 10 is provided. The anode of Zener diode 42 is connected to the base of a regulating transistor 38, the collector of which is coupled to the base of switching transistor 34 and via capacitor 32 and resistor 36 to the second winding 18 of coil 14. When the output voltage at point "A" reverse biases Zener diode 42 rendering it conductive, regulating transistor 38 is, in turn, also rendered conductive. This, in turn, results in the turn-off of switching transistor 34 causing the output voltage of the first winding 16 to charge capacitor 44 via diode 20. Grounded resistor 40 is selected so as to establish the current in Zener diode 42 necessary for its turn-on when the output voltage at point "A" exceeds a predetermined value. The regulator circuit of the present invention thus compares the voltage output at point "A" of the switching regulator power supply with a reference voltage level as established by Zener diode 42 and the base-emitter junction, $V_{be}$, of transistor 38. In this manner, the DC output level of voltage source 12 is precisely regulated to a predetermined level.

Also shown in dotted line form is a resistor 26 coupled between the base of regulating transistor 38 and point "A" at which the output voltage is measured. Resistor 26 may be incorporated in the present invention in place of Zener diode 42 in performing a voltage regulation function when small currents are conducted by the switching regulator power supply 10. For example, if the current in the switching regulator power supply is less than 100 microamps, resistor 26 may be used for voltage regulation. In this case, the reference voltage will be established by $V_{be}$ of regulating transistor 38. In the event circulating currents in the switching regulator power supply 10 exceed 100 microamps, Zener diode 42 provides better voltage regulation at point "A". When the voltage across Zener diode 42 is not large enough to render it conductive, regulating transistor 38 similarly remains nonconducting and the collector voltage of switching transistor 34 will increase to the point of Zener diode turn-on for power supply output voltage regulation. Similarly, when Zener diode 42 is replaced by resistor 26 and the voltage across resistor 40 is not large enough to turn-on regulating transistor 38, the collector voltage of switching transistor 34 increases so as to result in the turn-on of regulating transistor 38 for regulating the output voltage of the switching regulator power supply 10.

There has thus been shown a switching regulator power supply capable of providing a precisely regulated VDC output on a standby basis in response to the removal of a primary DC supply. The switching regulator power supply of the present invention automatically turns off when the primary DC source is restored in reducing power consumption, prolonging storage battery operating lifetime, and minimizing RFI during primary DC voltage supply operation.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

I claim:

1. A power supply circuit for driving a DC load device comprising:
   a primary DC voltage source subject to interruptions in operation coupled to an input terminal of said DC load device for providing power thereto; and
   a standby DC voltage source coupled to said input terminal for providing power to said load device during interruptions in the operation of said primary DC voltage source, said standby DC voltage source including:
      a charged storage battery for generating a standby DC voltage;
      self-oscillating control means responsive to the output voltage of said primary DC voltage source and coupling said storage battery to said DC load device for increasing the DC output voltage therefrom and providing said standby DC voltage to said DC load device when the output of said primary DC voltage source drops below a predetermined voltage level and wherein said storage battery does not provide an output to said DC load device when the output of said primary DC voltage source exceeds said predetermined voltage level; and
      regulation means coupled to said storage battery and said control means for comparing said standby DC voltage and said predetermined voltage level and adjusting said standby DC voltage so as to equal said predetermined voltage level.

2. A power supply circuit in accordance with claim 1 wherein said control means includes:
   capacitor means coupled to said input terminal and said storage battery and maintained in a charged state by means of said storage battery for providing said standby DC voltage to said DC load device by the discharge thereof when said primary DC voltage source drops below said predetermined voltage level; and
   diode means coupling said storage battery and said capacitor means for providing said standby DC voltage to said capacitor means and to the input terminal of said DC load device and for preventing the flow of power from said primary DC voltage source and said capacitor means to said standby DC voltage source.

3. A power supply circuit in accordance with claim 2 wherein said control means further includes inductive means in series with said diode means and coupling said storage battery and said capacitor means and forming a blocking oscillator circuit therewith for increasing the DC output voltage of said storage battery as applied to said DC load device and maintaining said capacitor means in a fully charged state.

4. A power supply circuit in accordance with claim 1 wherein said regulation means includes transistor switch means responsive to said standby DC voltage and rendered conductive thereby when the standby DC voltage level exceeds said predetermined voltage level for limiting said standby DC voltage to said predetermined voltage level.

5. A power supply circuit in accordance with claim 4 wherein said regulation means further includes a Zener diode coupled between said control means and said transistor switch means and rendered conductive when said standby DC voltage level exceeds said predetermined voltage level.

6. A power supply circuit in accordance with claim 4 wherein said regulation means further includes resistor means coupling said transistor switch means to said control means whereby said transistor switch means is rendered conductive when the standby voltage level exceeds said predetermined voltage level by more than the base-emitter voltage rating of said transistor switch means.

7. A power supply circuit in accordance with claim 1 wherein said DC load device is a volatile semiconductor memory device.

8. A power supply circuit in accordance with claim 1 wherein said primary DC voltage source includes an AC line source in combination with rectifier/regulator circuit means for providing a DC voltage to said load device.

9. In a DC power supply for energizing a load device including a line-coupled primary voltage source for providing a predetermined voltage level to said load device during the normal operation of said load device, the improvement comprising:
   a standby voltage source coupled to said primary voltage source and said load device and responsive to the output of said primary voltage source for providing said predetermined voltage level to said load device in the absence of said primary voltage source, said standby voltage source including a charged storage battery, self-oscillating power conversion means coupled to said charged storage battery and responsive to an output voltage therefrom for increasing the output voltage thereof to said predetermined voltage level, a charge storage device coupling said power conversion means to said load device wherein said charge storage device is maintained in a fully charged state when said predetermined voltage level is provided by said primary voltage source in preventing the discharge of said storage battery, and regulation means coupled between said charge storage device and said load device for providing said predetermined voltage level thereto when said storage battery discharges.

* * * * *